United States Patent [19]

Longo

[11] Patent Number: 5,455,075
[45] Date of Patent: Oct. 3, 1995

[54] HOT MELT CORROSION INHIBITING COATING COMPOSITION

[75] Inventor: Matthew W. Longo, La Grange, Ill.

[73] Assignee: Daubert Chemical Company, Inc., Chicago, Ill.

[21] Appl. No.: 209,294

[22] Filed: Mar. 10, 1994

[51] Int. Cl.⁶ ............................. B05D 1/18; B05D 7/14; C09D 191/06
[52] U.S. Cl. .................... 427/398.1; 106/14.38; 106/14.43; 106/14.44; 427/430.1; 427/435; 428/467
[58] Field of Search ............... 106/14.38, 14.43, 106/14.44; 427/372.2, 430.1, 435, 398.1; 428/457, 467

[56] References Cited

U.S. PATENT DOCUMENTS

| | | | |
|---|---|---|---|
| 3,956,223 | 5/1976 | Chiang et al. | 428/355 |
| 4,094,801 | 6/1978 | Forsberg | 252/33 |
| 4,150,192 | 4/1979 | Downey | 428/462 |
| 4,322,479 | 3/1982 | Forsberg | 428/471 |
| 4,386,173 | 5/1983 | Chang | 523/453 |
| 4,495,225 | 1/1985 | Ciuba et al. | 106/14.38 |
| 4,560,489 | 12/1985 | Muir et al. | 252/33.4 |
| 4,597,880 | 7/1986 | Eliades | 252/33.4 |
| 4,718,942 | 1/1988 | Laura et al. | 106/14.29 |
| 4,729,791 | 3/1988 | Laura et al. | 106/14.38 |
| 4,749,412 | 6/1988 | Ciuba et al. | 106/14.23 |
| 4,761,450 | 8/1988 | Lakshmanan et al. | 524/488 |
| 4,824,584 | 4/1989 | Muir et al. | 252/39 |
| 4,857,594 | 8/1989 | Lakshmanan et al. | 525/98 |
| 5,026,752 | 6/1991 | Wakabayashi et al. | 524/271 |
| 5,061,530 | 10/1991 | Wren | 427/430.1 |
| 5,106,415 | 4/1992 | Davidian | 106/14.24 |
| 5,308,514 | 5/1994 | Olson et al. | 252/18 |

FOREIGN PATENT DOCUMENTS

| | | | |
|---|---|---|---|
| 56-112974 | 9/1981 | Japan | 106/14.38 |
| 61-111382 | 5/1986 | Japan | 106/14.38 |

*Primary Examiner*—Anthony Green
*Attorney, Agent, or Firm*—Wallenstein & Wagner, Ltd.

[57] ABSTRACT

A hot melt corrosion inhibiting coating composition for application to chassis components and other heavy metal parts of transportation vehicles. The composition has superior adhesive wearability, coating uniformity and high temperature handleability and stability.

15 Claims, No Drawings

5,455,075

HOT MELT CORROSION INHIBITING COATING COMPOSITION

TECHNICAL FIELD

This invention relates to a corrosion inhibiting coating, and more particularly to a hot melt, corrosion inhibiting coating with superior adhesion, coating uniformity and high temperature handleability and stability for use in coating chassis components and other heavy metal parts of automobiles or other transportation vehicles.

BACKGROUND OF THE INVENTION

Inhibiting the corrosion or rusting of ferrous and non-ferrous metals due to exposure to moisture, air, especially moist air, and chemicals, such as sodium chloride, has been the focus of many proposed coating compositions. Coating compositions are particularly useful for preventing corrosion and rust on chassis components such as frames, cross-members and engine cradles and other heavy metal parts of automobiles and other transportation vehicles. While, in most cases, ferrous metals, such as iron and steel represent the areas where rust and corrosion problems are particularly encountered, various non-ferrous metals, such as aluminum, are also subject to corrosion.

The corrosion inhibiting compositions which have been or are currently being commercially used, fall generally into two classes. One class of compositions forms thermoplastic, wax-like films which are soft and may be readily stripped off or removed from the metal surfaces, for example, by organic solvent. Furthermore, because these compositions are generally non-drying and lacking in cohesive strength, they can be readily removed by abrasion, impact or elevated temperatures. Significant problems associated with these compositions include low sag resistance during the service life of the vehicle. The use of catalytic converters in many of today's automotive engines results in higher engine operating temperatures. Instances have occurred where the corrosion inhibiting coating has melted and run off metal parts due to high engine temperatures, decreasing the rust prevention value of the coating, and sometimes even causing fires within the engine compartment or under the vehicle.

The other class of compositions is generally epoxy-based, deposited by electro-deposition techniques and cured in paint bake ovens to form hard coatings. These coatings are essentially permanent and are removable only with great difficulty. A problem associated with these compositions for use on frame components is the high overall costs compared to thermoplastic, wax-like coatings. Contributing to the high costs are high capital expense, a greater degree of surface preparation, and high coating and waste disposal costs. Additionally, the electro-deposited coatings do not effectively coat the inside hollow box sections found in many modern automotive frames.

There is a need for a corrosion inhibiting coating which forms a thermoplastic and wax-like film that can withstand long-term, high temperature engine operation without melting off the coated parts, not only to maintain protection to the part, but also to avoid a fire hazard.

U.S. Patent No. 4,094,801, issued Jun. 13, 1978 to Forsberg, discloses a magnesium-containing composition comprising a mixture of at least one magnesium hydroxide, magnesium oxide, or a magnesium alkoxide; at least one oleophilic organic reagent, such as sulfonic and carboxylic acids; water, and at least one organic solubilizing agent for the oleophilic organic reagent. Uses for this composition are said to include as additives for lubricants and fuels and as protective coating compositions for metal surfaces.

U.S. Pat. No. 4,322,479, issued Mar. 30, 1982, to Forsberg, a divisional of a continuation of a divisional of U.S. Pat. No. 4,094,801, discloses a thixotropic magnesium-containing composition comprising at least one of magnesium hydroxide, magnesium oxide, hydrated magnesium oxide, and a magnesium alkoxide; at least one oleophilic organic reagent, such as a carboxylic or sulfonic acid; water, optional under certain conditions; and, at least one organic solubilizing agent for the oleophilic organic reagent. The composition is said to be useful as an additive for lubricants and fuels and as a protective coating or metal surfaces.

U.S. Pat. No. 4,150,192, issued Apr. 17, 1979 to Downey, discloses a sprayable hot melt rust inhibitor composition comprising a mixture of a sulfonate, optionally a carbonate, optionally an oxidized petrolatum, diluent oil, microcrystalline wax, active filler and thermoplastic resin. Uses for this composition are said to be for coating automobile parts.

U.S. Pat. No. 4,386,173, issued May 31, 1983 to Chang discloses a sprayable hot melt coating composition comprising an epoxy resin-elastomer adduct mixture, microcrystalline wax, a petroleum sulfonate complex dispersed in an oil, and other optional ingredients including fillers, pigments and/or additional nonvolatile oil. The petroleum sulfonate complex is admixed with the epoxy resin-elastomer adduct to form a homogenous composition without the use of organic solvents. Uses for this composition are said to be for corrosion prevention.

U.S. Pat. No. 4,729,791, issued Mar. 8, 1988 to Laura et al., discloses a corrosion inhibiting composition containing a thixotropic overbased alkaline earth metal sulfonate complexed with an alkaline earth metal sulfonate, a drying oil, a drier and other ingredients such as mineral oil, waxes, petrolatum and resins. Uses for this composition are said to be for inhibition of corrosion or rusting of ferrous and non-ferrous metals. Drying oils are typically designed to react with oxygen and crosslink to form a film. Disadvantages to drying oils include, typically the presence of organic solvents, a long drying time (4–24 hours) and overspray and drippings which are not reusable. Furthermore, drying oils can cause the coating to buildup on equipment during the application procedure, which must be removed, adding extra labor and time costs to the process.

New corrosion preventative compositions have now been found which incorporate thermoplastic elastomers in an amount effective to impart superior flexibility and adhesion at low temperatures while also imparting superior handling characteristics at high temperatures. Other advantages include stability from separation during long-term storage, lower volatility resulting in a significant reduction in VOC emissions, a high flash point for improved safety during application and use, resistance to water abrasion, and an absence of heavy metals. Furthermore, the present compositions are more cost effective than currently available products, are easier to apply, have a lower density, thus a lighter weight after application, and result in continuously uniform coating thicknesses, regardless of thickness or shape of the metal substrate. These characteristics overcome the deficiencies of previously known compositions, while meeting the strict performance requirements for corrosion resistant coatings used by the automotive industry.

SUMMARY OF THE INVENTION

The present invention is a corrosion inhibiting coating. Specifically, a hot melt corrosion inhibiting coating composition is disclosed comprising about 7.0 to about 21.0 weight percent of a plasticizer; about 8.0 to about 25.0 weight percent of a thixotropic overbased alkaline earth metal organic sulfonate complex with an alkaline earth metal carbonate colloidally dispersed in a carrier; about 5.0 to about 25.0 weight percent of a Newtonian alkaline earth metal organic sulfonate; about 0.1 to about 0.4 weight percent of an antioxidant; about 3.5 to about 7.0 weight percent of a thermoplastic elastomer; and, about 32.0 to about 45.0 weight percent of a microcrystalline wax. The disclosed corrosion resistant coating composition produces a thin, uniform protective coating with superior adhesion, wearability and handling characteristics at high temperatures. In a preferred embodiment, an alcohol component to improve water resistance, a polyethylene homopolymer for adjusting the melting point, and an additive, including a pigment, to improve ultraviolet light stability and add pigmentation, may be added to the composition. In other embodiments, the invention provides a method for coating of a metal part comprising applying a thin, uniform film of the molten coating composition to the surface and solidifying the composition.

Other advantages and aspects of the present invention will become apparent upon reading the following detailed description of the invention.

DETAILED DESCRIPTION

While this invention is susceptible of embodiment in many different forms, there will herein be described in detail a preferred embodiment of the invention with the understanding that the present disclosure is to be considered as an exemplification of the principles of the invention and is not intended to limit the broad aspects of the invention to the embodiments illustrated.

In greater detail, the invented corrosion inhibiting coating compositions offer a number of advantages over known rustproofing systems. When coated onto a metal substrate, the invented coatings exhibit superior warm temperature handleability. Accordingly, these compositions are able to withstand temperatures in excess of 40° C. (100° F.) and up to 60° C. (140° F.), with minimal transfer, which may occur during storage of the coated parts in warmer climates prior to assembly, during the assembly process, or due to normal vehicle engine operation. Warm temperature handleability is important because the coated parts can be handled without the coating transferring from the part onto the hands or clothing of personnel. Transfer of the coating from the metal substrate can decrease the long-term rust protection of the coating, possibly decreasing the life of the vehicle.

The compositions of the present invention also exhibit high temperature sag resistance. Sag, or the melting and running off of the coating from the vehicle part, can occur especially during long-term high temperature engine operation common in today's vehicles with catalytic converters. Runoff of the coating not only decreases the overall corrosion protection of the part, but has also been know to cause fires within the engine compartment or under the vehicle. High temperature sag resistance means the coating has good adhesion to metal substrates even at high temperatures. The composition of the present invention is able to withstand temperatures as high as about 93° C. (200° F.) to about 104° C. (220° F.), significant enough to avoid the problems of previous compositions.

In addition, the hot melt composition of the present invention is easier to apply than existing compositions. As will be discussed in more detail, the rheology of the composition is such that application of the composition, preferably by dipping, results in a uniform coating thickness over the entire part. A uniform coating thickness is important in that it provides uniform protection over the entire coated part. This is a significant advantage for coating modern automotive frames which are designed having non-uniform metal thicknesses and hollow box sections. During application of a currently available coating composition, the thicker areas and the interior box sections of an automotive frame tend to cool at a slower rate than the thinner areas and the exterior surface sections. This difference in cooling time results in longer draining-off time of the coating composition from the thicker areas and interior box sections. As the coating continually drains off the thicker areas of the frame, less coating film builds up on these areas than on the thinner areas, resulting in uneven coating thicknesses over the entire part. The rheology of the composition in the present invention helps to overcome this disadvantage, providing even coverage over all areas of the frame. Furthermore, the rheology of the composition can be specifically tailored to the requirements of the manufacturer for coating thickness and assembly line operation.

Although known in the prior art as corrosion inhibitors, the use of a Newtonian calcium sulfonate in conjunction with a thixotropic overbased calcium organic sulfonate complexed with calcium carbonate, is not typical to the art. As will be discussed later, specific amounts of these two ingredients, when used in combination, allows for adjustments in rheology of the compositions to meet specific end use requirements. Furthermore, using these two ingredients in combination enables the hot melt composition to have stable rheology, meaning that it does not change significantly over the application temperature range found in most hot melt dip coating lines (about 121° C. (250° F.) to about 143° C. (290° F.). Rheology stability is important during application of the coating because it provides for more uniform coating of the metal substrate, regardless of changes in the temperature of the dip tank. More uniform coating results in better appearance of the part and improved corrosion resistance.

A preferred hot melt coating composition of the present invention exhibiting the above-identified advantages comprises between about 7.0 to about 21.0 weight percent plasticizer; between about 8.0 to about 25.0 weight percent thixotropic overbased alkaline earth metal organic sulfonate complex with carbonate colloidally dispersed in a carrier; between about 5.0 and about 25.0 weight percent Newtonian alkaline earth metal organic sulfonate; between about 3.5 and about 7.0 weight percent thermoplastic elastomer; between about 0.1 and about 0.4 weight percent antioxidant; and, between about 32.0 to about 45.0 weight percent microcrystalline wax, to add up to a total of 100 percent. In a more preferred embodiment, the composition also includes between about 0.0 and about 10.5 weight percent, preferably about 4.0 to about 7.0 weight percent alcohol component, between about 0.5 to about 9.0 weight percent polyethylene homopolymer, and between about 0.0 and about 5.0 weight percent, preferably about 2.5 to about 3.5 weight percent additive.

The preferred coating composition of the present invention has the following physical and chemical properties:

Brookfield (Model RV) viscosity (No. 1 spindle at 10 rpm):
  100–400 centipoise at 121° C. (250° F.)
  100–350 centipoise at 132° C. (270° F.).
Flash point: 279° C. (535° F.).
Melting point (ASTM D-127): 96° C. (205° F.) minimum lower melt; 107° C. (225° F.) minimum higher melt.

Non-volatile (ASTM D-92): 99.7 wt. % minimum.

Needle hardness (ASTM D-1321): 40–55) millimeters.

For the compositions of this invention, suitable plasticizers are those that are effective to plasticize the composition, providing low temperature adhesion and chip resistance properties to the coating. Suitable plasticizers include the esters of dicarboxylic acids (e.g. phthalic acid, succinic acid, alkyl succinic acids and alkenyl succinic acids, maleic acid, azelaic acid, adipic acid, malonic acid, etc.) with a variety of alcohols (e.g., butyl alcohol, hexyl alcohol, dodecyl alcohol, ethylene glycol, diethylene glycol monoether, propylene glycol, etc.). Specific examples of these esters include dioctyl phthalate, didecyl phthalate, dibutyl adipate, di(2-ethylhexyl) sebacate, diisooctyl azelate and the like. Other suitable plasticizers include natural or synthetic oils, such as naptheninc or paraffinic oil having a flash point greater than 400° F. Paraffinic oil, such as Citgo 340N, distributed by Citco Petroleum Corporation, is preferred because it has a high flash point, low viscosity and low smoking at 260° F. The amount of plasticizer useful in the present invention is an amount effective to impart low temperature flexibility and to plasticize the composition at low temperatures without reducing the hardness of the wax film at room or elevated temperatures, preferably between about 9.0 and about 13.0 weight percent.

Thixotropic, or gel-like, overbased alkaline earth metal organic sulfonates complexed with alkaline earth metal carbonates suitable in the invented compositions are known in the art. Such materials are disclosed in U.S. Pat. No. 4,729,791, discussed above. The organic sulfonate portion of the thixotropic complexes is derived from branched or straight chain monoalkylbenzene or dialkylbenzene sulfonic acids or mixtures of such sulfonic acids, the alkyl radical or radicals containing at least 12 carbon atoms and generally in the range of from about 12 to about 30 carbon atoms. Alkaline earth metals suitable for use in the complex include calcium, magnesium and barium. Preferably, these thixotropic overbased organic sulfonates comprise complexes of calcium organic sulfonates with calcium carbonate colloidally dispersed in a carrier. The carrier is preferably a non-volatile oil, such as mineral lubricating oil and synthetic lubricating oils, in an amount not exceeding about 75 parts per part of complex. Examples of commercially available dispersions of these thixotropic overbased calcium organic sulfonates complexed with calcium carbonate compositions in diluent oil are sold under the tradename SACI, owned by Witco Chemical Corporation, New York, N.Y. Examples of dispersions which may be employed in the present invention include SACI-200, SACI-200 -HM, available from Witco Chemical Company, Lubrizol 2358, available from Lubrizol Corporation, and Lockhart B-9200 and Lockhart B-9240, available from Lockhart Chemical. SACI-RP-230-HF, having a composition of 75.0 weight percent 2000 SUS (at 40° C. (100° F.)) Napthenic oil, 12.5 weight percent calcium carbonate and 12.5 weight percent calcium sulfonate, is preferred because it provides long-term high temperature stability, excellent corrosion protection and a high flash point. The thixotropic overbased calcium organic sulfonate complexes as used in an amount effective to provide corrosion resistance and rheology control to the compositions. The amount of thixotropic overbased calcium organic sulfonate complexes preferably is between about 8.0 and 25.0 weight percent, and more preferably between about 11.0 and about 16.0 weight percent.

Newtonian alkaline earth metal organic sulfonates are used in conjunction with the thixotropic complexes described above. Newtonian alkaline earth metal organic sulfonates generally have a lower viscosity, having more of a water or syrup-like consistency than the gel-like thixotropic complexes. Alkaline earth metal organic sulfonates suitable for use in the present invention include calcium, magnesium, barium, sodium and zinc. Commercial products of these Newtonian alkaline earth metal organic sulfonates include Locksol 6300, Locksol 6941, Witco Petronate 25-C, and Surchem 301. SACI-RP-280 having a composition of 44.7 weight percent calcium sulfonate, 1.3 weight percent calcium carbonate, 55.0 weight percent 2000 SUS Napthenic oil, is preferred in the present composition because it provides high temperature stability, high flash point and good corrosion protection. Newtonian calcium sulfonate is also useful for providing corrosion protection. The amount of Newtonian calcium sulfonate useful in the present invention is preferably in a ratio of about 40 to about 60 weight percent to the amount of thixotropic complex. Preferably, the amount of Newtonian alkaline earth metal organic sulfonates useful in the present invention is between about 5.0 and 25.0 weight percent, and more preferably between about 17.0 to about 23.0 weight percent. These amounts are preferred to provide the greatest degree of corrosion protection without producing a coating which is too soft and therefore subject to abrasion and wear.

In a preferred embodiment of the invention, an alcohol component comprising at least one alcohol having about 14 to about 32 carbon atoms and suitably including normal and branched blends, can be added to the invented compositions. Preferably, a blend of linear and branched alcohols with carbon atoms ranging from 20 through 32, and of hydrocarbons with carbon numbers ranging from 24 through 40, is used. Commercially available alcohol components include EPAL 20+ from Ethyl Corporation or ALFOL 20+ available from Vista Chemical. The alcohol component is used in amounts to improve the water resistance of the composition, which also improves adhesion under moist conditions. The amount of alcohol component useful in the present invention is preferably up to about 10.5 weight percent, and more preferably about 4.0 to about 7.0 weight percent.

In order to protect and stabilize the composition prior to application onto a metal substrate, an antioxidant may be added. Any suitable antioxidant capable of providing high temperature stability to the composition can be used. Hindered phenol type antioxidants are preferred for use in the present invention. Commercially available antioxidants include Ethyl 703, IRGANOX 1035 and IRGANOX 1010. IRGANOX 1010 available from Ciba-Geigy is preferred. In order to achieve high temperature stability of the invented compositions, and thereby facilitate high temperature application and utility, the antioxidant is preferably used in a range of about 0.1 to about 0.4 weight percent of the composition.

A thermoplastic elastomer, preferably a styrene-based thermoplastic elastomer, is also useful in the invented compositions. Styrene-based thermoplastic elastomers comprise blocks of hard segments, e.g., polystyrene, and blocks of soft segments, e.g., polyisoprene, polybutadiene, poly(ethylene-propylene), poly(ethylene-butylene), and polypropylene. Thus, useful styrene-based elastomers may comprise, for example, blocks of polystyrene and blocks of polyisoprene, or blocks of polystyrene and blocks of polybutadiene, or blocks of polystyrene and blocks of poly(ethylene-butylene). Examples of styrene-based thermoplastic elastomers useful in the present invention, include styrene-ethylene-butylene-styrene block copolymers (e.g., KRATON G-1650, G-1652, and G-1657) and styrene-ethylene-propylene block copolymers (e.g., KRATON G- 1701, G-1702 and G-1726X), all commercially available from Shell Chemical Company. Combinations of these block copolymers can also be included. KRATON G-1652 is preferred because it has superior physical properties useful in this invention, including weatherability in that it can withstand prolonged outdoor exposure, high heat resistance, and excellent chemical resistance. The thermoplastic elastomer is added in an amount effective to impart warm weather handleability, the low temperature flexibility and the impact resistance of the composition. The amount of thermoplastic elastomer useful in the present invention to achieve the desired characteristics, without an undesirable increase in viscosity, is preferably in a range of about 3.5 to about 7.0 weight percent, more preferably about 3.5 to about 6.0 weight percent of the composition.

To enhance the high temperature sag resistance discussed earlier, a polyethylene homopolymer wax is preferably included in the invented compositions. In the present invention, any suitable extremely hard, high melting (i.e., greater than 106° C. (222° F.)), low viscosity, crystalline polymer can be used, including polyethylene, polypropylene and ethylene vinyl acetate. An example of a wax suitable for use in the present invention include a polyethylene wax such as Polywax 3000 from Petrolite Corporation, Tulsa, Okla., and AC-6 from AC-Polyethylene. The polyethylene wax imparts resistance to flow by increasing the melting point of the composition. The amount of polyethylene wax useful in the present invention is an amount effective to provide the desired high temperature sag resistance without excessively increasing the application temperature, preferably up to about 9.0 weight percent, more preferably about 4.5 to about 7.0 weight percent.

A film former, preferably in the form of a wax, acts as a carrier in the invented compositions. Such waxes are usually obtained as residual products of vacuum distillation of lubricating oils and typically contain only a minor amount of straight chain paraffinic hydrocarbons. Examples of crystalline (including microcrystalline) and non-crystalline waxes useful in the present invention include natural hydrocarbon waxes such as petrolatum, paraffin and olefin waxes, and synthetic hydrocarbon waxes such as polyethylene and other polyolefins. Commercially available waxes useful in the present composition include Shell Max 400 from Shell Chemical Company, Multiwax ML-445 and Multiwax 180-M from Witco Chemical Company, and Citgo Hi-618 wax from Citgo Petroleum Corporation. Microcrystalline wax is preferred because of its low cost, low melt viscosity, film forming hardness and excellent water resistance. The amount of microcrystalline wax added to the composition will vary depending upon the amounts of other ingredients added, and is preferably between about 32.0 and 45.0 weight percent. The amount of microcrystalline wax useful in the present invention is in an amount effective to impart film formation on a receiving surface.

Various additives, including pigments can be included in the invented compositions. Examples include adhesion promoters, ultraviolet blocking agents, and flame retardants, including aluminum trihydrate and phosphorus containing compounds. Preferably, pigments are added to the composition. Examples of pigments include carbon black, titanium dioxide, calcium carbonate, iron oxides, talcs, clays, aluminum, corrosion preventative pigments including zinc phosphate, zinc molybdate, and various color pigments. The type of pigments used will depend upon the end-use requirements. Carbon black is a preferred pigment because it provides pigmentation, ultraviolet blocking protection and improved binding ability. Examples of commercially available carbon blacks include Monarch 700 and Sterling R, both from Cabot. Titanium dioxide also provides ultraviolet protection, and can be tinted to various color shades depending upon end use requirements. The amount of pigment useful in the present invention generally ranges up to about 5.0 weight percent. A preferred pigmented composition for use in coating metal substrates preferably contains about 2.5 to about 3.5 weight percent carbon black or titanium dioxide.

The composition of this invention can conveniently be mixed and prepared by combining the components comprising plasticizer, thixotropic overbased complex, Newtonian calcium sulfonate, carbon black and antioxidant in a suitable mixing device, such as a kettle mixer with a ribbon blade. The components are mixed at speeds of about 50 to about 300 rpm, and at temperatures not exceeding 48° C. (120° F.), to maintain a heavy enough consistency and ensure complete dispersion of the carbon black. Mixing continues for approximately 30 minutes or until a smooth consistency is reached. The alcohol component and the thermoplastic elastomer component are added, while mixing continues for approximately 15 minutes at a temperature not exceeding 48° C. (120° F.). While mixing continues, the temperature of the mixture is increased to about 149° C. (300° F.). The temperature is thereby maintained between about 149° C. (300° F.) to about 160° C. (320° F.) while mixing for about 1 to about 1½ hours or until all of the thermoplastic elastomer is dispersed. The polyethylene homopolymer in pellet form is then added to the mixture. Mixing is continued for about 30 minutes at temperatures of about 149° C. (300° F.) to about 160° C. (320° F.). Finally, the microcrystalline wax is added and mixing is continued at about 145° C. (300° C.) for an additional 45 minutes. The mixing is performed with sufficient shear to obtain a uniform mixture of components.

The invented compositions are particularly useful as corrosion resistant coatings for metal substrates, particularly frames and other metal parts, of automobiles or other transportation vehicles. Generally, a coating is applied to a substrate, typically a metal substrate, by applying a continuous layer of coating in liquid form to the substrate and cooling the coating to render it solid and promote adhesion between the coating and the substrate. The coating can be applied to the substrate by any suitable technique such as brushing, spraying, dip-coating, flow-coating, roller-coating and the like. Dip-coating is currently the preferred method in the automotive industry because dip-coating provides complete coverage to the metal substrate, including crevices and hard-to-reach areas where corrosion pockets tend to form. Dip-coating is typically performed, for example, as described in U.S. Pat. No. 5,061,530, incorporated by reference herein. The coating forms a continuously uniform, wax-like finish when cooled to room temperature, and depending on temperature and thickness and configuration of the part, within about 10 to about 30 minutes having a thickness in the range of about 25 to about 200 microns. In the present invention, a thickness of about 75 to about 125 microns is preferred because this thickness provides adequate corrosion protection for the life of the part. As mentioned earlier, viscosity of the composition is an important feature related to the dip-coating operation. The viscosity of the composition is generally about 100 to about 400 centipoise (cps), and preferably about 200 to about 325 cps. The preferred range of viscosity ensures uniform coating over the entire metal substrate, regardless of the variations in surface contour of the substrate. Again, the rheology can be adjusted to meet the specific requirements of different end uses.

The present invention is described further by the following examples. These examples are for the purpose of illustration and not limitation.

EXAMPLES 1–3

Hot melt corrosion resistant coating compositions were prepared using the formulations in Table 1. Dip coated parts were subjected to a variety of tests as described in General Motors (GM) Engineering Standard 998–5404, which provides specific requirements for corrosion preventive compounds used as a protective coating on vehicle frames and chassis components. The results of these tests using the formulations of Examples 1–3 are listed in Tables 2 and 3. Unless indicated otherwise, all parts and percentages are by weight.

Example 1

In a mixing tank equipped with a high shear ribbon blade and a heating element, a blend of 21 parts of plasticizer, 13 parts of thixotropic calcium sulfonate complex, 7.5 parts of Newtonian calcium sulfonate, 1.5 parts of carbon black, and 0.2 parts of antioxidant was prepared. The mixture was blended at temperatures not exceeding 48° C. (120° F.) for 30 minutes, at a blade speed of approximately 200 rpms, to achieve a paste-like consistency. While maintaining the temperature and blending speed, 5.5 parts of alcohol component and 5.0 parts of thermoplastic elastomer were added and the mixing continued for another 15 minutes until a thick, lumpy paste formed. The temperature of the mixture was increased to 149° C. (300° F.) and the mixing was continued at 100 rpms for approximately 1 hour, until all of the thermoplastic elastomer was dispersed, and the composition was a smooth, heavy liquid. Then 7.0 parts of polyethylene homopolymer was added and the mixture blended at 149° C. (300° F.), 100 rpm for an additional 30 minutes. Finally, 37.0 parts of microcrystalline wax in melt form was added to the hot melt blend and mixing continued at 149° C. (300° F.), 100 rpm for an additional 45 minutes.

Test panels were prepared as outlined in the GM specification using the above formulation. The coated panels were then subjected to the tests outlined in the GM specification. The results of these tests are recorded in Tables 2 and 3.

Example 2

Example 2 was mixed according to the procedure described for Example 1, including adjustments to the formulation of Example 1. Specifically, the carbon black was increased from about 1.5 parts to about 2.5 parts. In addition, the amount of Newtonian calcium sulfonate was increased from about 7.5 parts to about 19.0 parts, the amount of plasticizer was reduced from about 21.0 parts to about 12.0 parts, the amount of microcrystalline wax was reduced from about 39.3 parts to about 38.8 parts, and the amount of polyethylene homopolymer was reduced from about 7.0 parts to about 4.0 parts.

Test panels were prepared as outlined in the GM specification using this formulation. The changes in the formulation are reflected by the improvements in performance properties, specifically corrosion resistance and the Florida exposure/salt spray tests, and the lower melting point, as shown in Tables 2 and 3. An additional advantage of this formulation is that it is useful in dipping procedures having lower application temperature requirements.

Example 3

Example 3, also mixed according to the procedure described for Example 1, represents an adjustment to the formulation of Example 2. Specifically, the polyethylene homopolymer was increased from about 4.0 parts to about 7.0 parts, and the microcrystalline wax was reduce from about 38.8 parts to about 36.8 parts. The polyethylene homopolymer contributes directly to the melting point and high temperature sag resistance of the hot melt composition. Therefore, by increasing the amount of polyethylene homopolymer by 2%, the sag resistance of the hot melt increased from 205° F. to 225° F. Again, test panels were prepared as in Examples 1 and 2 and tested under the GM specification.

TABLE 1

| COMPOUND | WEIGHT PERCENT | | |
|---|---|---|---|
| | EXAMPLE 1 | EXAMPLE 2 | EXAMPLE 3 |
| PLASTCIZER | 21.0 | 12.0 | 12.0 |
| CALCIUM SULFONATE COMPLEX | 13.0 | 13.0 | 13.0 |
| NEWTONIAN CALCIUM SULFONATE | 7.5 | 19.0 | 19.0 |
| ANTIOXIDANT | 0.2 | 0.2 | 0.2 |
| ALCOHOL COMPONENT | 5.5 | 5.5 | 5.5 |
| CARBON BLACK | 1.5 | 2.5 | 2.5 |
| THERMOPLASTIC ELASTOMER | 5.0 | 5.0 | 5.0 |
| POLYETHYLENE WAX | 7.0 | 4.0 | 7.0 |
| MICRO-CRYSTALLINE WAX | 39.3 | 38.8 | 36.8 |

TABLE 2

PERFORMANCE PROPERTIES COMPARISON

| | Performance Property | GM 998-5404 Requirement | Example 1 | Example 2 | Example 3 |
|---|---|---|---|---|---|
| 1 | Gravelometer 20° C. | Good - Excellent | Good | Good | Good |
| 2 | Corrosion Resistance, 1000 hours salt spray | Less than 3 mm creep | No corrosion, 1 mm creep | No corrosion, no creep | No corrosion, no creep |
| | Gravelometer/336 hrs., S.S. | Good - Excellent | Good | Excellent | Excellent |
| 3 | Poultice Cycle Test | No abnormalities | No corrosion or loss of adhesion | No corrosion or less of adhesion | No corrosion or less of adhesion |

TABLE 2-continued

PERFORMANCE PROPERTIES COMPARISON

| Performance Property | GM 998-5404 Requirement | Example 1 | Example 2 | Example 3 |
|---|---|---|---|---|
| 4 Detergent Wash Resistance | No loss of coating | No surface defects or loss of adhesion | No surface defects or loss of adhesion | No surface defects or loss of adhesion |
| 5 QUV/Salt Spray | Less than 3.0 mm creep | Pass: 1 mm creep | Pass: no creep | Pass: no creep |
| 6 High Temperature Sag 75–125 microns | Report | Pass 240° F. | Pass 220° F. | Pass 240° F. |
| High Temperature Sag 960–1060 microns | Report (See attd. specification: Drip Performance of Hot Melt Wax) | Pass 220° F. | Pass 200° F. | Pass 220° F. |
| 7 Florida Exposure/Salt Spray | Less than 3.0 mm creep | Fail, 3 + mm creep | Pass, no creep | Pass, no creep |
| 8 Handleability/38° C., 2.3 kg | No transfer to white glove | No transfer | No transfer | No transfer |

TABLE 3

PHYSICAL PROPERTIES COMPARISON

| Physical Property | GM 998-5404 Requirement | Example 1 | Example 2 | Example 3 |
|---|---|---|---|---|
| 1 Color | Black | Black Film | Black Film | Black Film |
| 2 Solids Content | 99% Minimum | 99.7%+ | 99.7%+ | 99.7%+ |
| 3 Flash Point °C. | 200° C. | 279° C. | 279° C. | 279° C. |
| Flash Point °F. | 392° F. | 535° F. | 535° F. | 535° F. |
| 4 Melting Point °C. | 77° C. | 107° C. | 96° C. | 107° C. |
| Melting Point °F. | 170° F. | 225° F. | 205° F. | 225° F. |
| 5 Density 25° C. | 1.08–1.20 kg/l | 0.92 | 0.92 | 0.92 |
| Wt/Gal 77° F. | 9.0–10.0 lbs/gal | 7.0 | 7.0 | 7.0 |
| Density 120° C. | 0.94–1.14 kg/l | 0.84 | 0.84 | 0.84 |
| Wt/Gal 250° F. | 7.8–9.5 lbs/gal | 7.0 | 7.0 | 7.0 |
| 6 Hardness | 60 mm Max. | 50 mm | 50 mm | 50 mm |
| 7 Viscosity 250° F., Spindle #1, 10 rpm | 120–160 cps | 350–450 cps | 200–350 cps | 350–450 cps |
| Viscosity 270° F., Spindle #1, 10 rpm | | 200–350 cps | 200–300 cps | 200–350 cps |

Tables 2 and 3 above show the performance and physical property results of the three formulations when tested against the requirements as listed in General Motors (GM) Specification 998–5404. The results show that Example 2, the preferred formulation, meets or exceeds the requirements of the GM Specification.

While specific embodiments have been illustrated and described, numerous modifications come to mind without departing from the spirit of the invention and the scope of the accompanying claims.

I claim:

1. A hot melt corrosion resistant coating composition comprising:
    (a) about 7.0 to about 21.0 weight percent of a plasticizer,
    (b) about 8.0 to about 25.0 weight percent of a thixotropic overbased alkaline earth metal organic sulfonate complex with an alkaline earth metal carbonate,
    (c) about 5.0 to about 25.0 weight percent of a Newtonian alkaline earth metal organic sulfonate,
    (d) about 0.1 to about 0.4 weight percent of an antioxidant,
    (e) about 3.5 to about 7.0 weight percent of a thermoplastic elastomer; and,
    (f) about 32.0 to about 45.0 weight percent of a microcrystalline wax.

2. The corrosion resistant coating composition of claim 1 further comprising a polyethylene homopolymer.

3. The composition of claim 2 wherein the polyethylene homopolymer is present in an amount of about 0.5 to about 9.0 weight percent of the total composition.

4. The corrosion resistant coating composition of claim 1 further comprising an alcohol component.

5. The composition of claim 4 wherein the alcohol component is present in an amount of about 4.0 to about 7.0 weight percent of the total composition.

6. The corrosion resistant composition of claim 1 further comprising an additive.

7. The composition of claim 6 wherein the additive includes a pigment.

8. The composition of claim 7 wherein the pigment is present in an amount of about 2.5 to about 3.5 weight percent of the total composition.

9. The corrosion resistant composition of claim 1 wherein the composition has a viscosity of about 100 to about 400 centipoise.

10. A metal substrate coated with the composition of claim 1.

11. A method of applying a coating composition comprising about 7.0 to about 21.0 weight percent of a plasticizer; about 8.0 to about 25.0 weight percent of a thixotropic overbased alkaline earth metal organic sulfonate complex with an alkaline earth metal carbonate; about 5.0 to about 25.0 weight percent of a Newtonian alkaline earth metal organic sulfonate; about 0.1 to about 0.4 weight percent of an antioxidant; about 3.5 to about 7.0 weight percent of a thermoplastic elastomer; and, about 32.0 to about 45.0 weight percent of a microcrystalline wax to a substrate comprising the steps of:

(a) depositing a continuously uniform layer of the coating composition to the substrate;

(b) cooling the coating composition for an amount of time effective to solidify the coating and promote adhesion to the substrate.

12. The method of claim 11 wherein the depositing step includes dip-coating.

13. The method of claim 11 wherein the substrate includes a metal chassis component of a transportation vehicle.

14. The method of claim 11 wherein the continuously uniform layer of coating has a thickness of about 25 to about 200 microns.

15. The method of claim 11 wherein the coating composition has a viscosity of about 100 to about 400 centipoise.

* * * * *

UNITED STATES PATENT AND TRADEMARK OFFICE
CERTIFICATE OF CORRECTION

PATENT NO. : 5,455,075
DATED : October 3, 1995
INVENTOR(S) : Matthew W. Longo

It is certified that error appears in the above-indentified patent and that said Letters Patent is hereby corrected as shown below:

In Col. 8, line 32, please delete "C" and replace it with --F--.

Signed and Sealed this

Sixth Day of August, 1996

Attest:

BRUCE LEHMAN

Attesting Officer        Commissioner of Patents and Trademarks